(12) United States Patent
Cazalet et al.

(10) Patent No.: US 10,416,479 B2
(45) Date of Patent: *Sep. 17, 2019

(54) WIRING IN A HEAD-MOUNTABLE DEVICE

(71) Applicant: Google LLC, Mountain View, CA (US)

(72) Inventors: Peter Cazalet, Los Gatos, CA (US);
Livius Chebeleu, San Jose, CA (US);
Michael Kubba, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,734

(22) Filed: Nov. 20, 2017

(65) Prior Publication Data

US 2018/0095299 A1 Apr. 5, 2018

Related U.S. Application Data

(63) Continuation of application No. 15/199,813, filed on Jun. 30, 2016, now Pat. No. 10,168,555.

(51) Int. Cl.
*G02C 11/00* (2006.01)
*B29D 12/02* (2006.01)
(Continued)

(52) U.S. Cl.
CPC .............. *G02C 11/10* (2013.01); *B29D 12/02* (2013.01); *G02B 27/0176* (2013.01); *G02C 1/06* (2013.01);
(Continued)

(58) Field of Classification Search
CPC . G02C 11/10; G02C 1/06; G02C 5/14; G02C 5/12; G02C 1/10; G02B 27/0176;
(Continued)

(56) References Cited

U.S. PATENT DOCUMENTS

| 7,481,529 | B1 | 1/2009 | Chen |
| 7,527,374 | B2 * | 5/2009 | Chou ..................... G02C 11/06 |
| | | | 351/154 |
| 10,168,555 | B1 * | 1/2019 | Cazalet .................... G02C 1/06 |
| 2010/0103077 | A1 * | 4/2010 | Sugiyama ............ G02B 27/017 |
| | | | 345/8 |

(Continued)

FOREIGN PATENT DOCUMENTS

CN 204422884 6/2015

OTHER PUBLICATIONS

Communication Relating to the Results of the Partial International Search dated Sep. 18, 2017 issued in connection with International Application No. PCT/US2017/037966, filed on Jun. 16, 2017, 3 pages.

*Primary Examiner* — Tuyen Tra
(74) *Attorney, Agent, or Firm* — McDonnell Boehnen Hulbert & Berghoff LLP

(57) ABSTRACT

The present disclosure relates to a head mountable apparatus including two rims, where an inner top portion of each rim comprises a rim cavity, where each rim cavity comprises a first section and a second section, where a depth of the first section extends from an edge of the respective rim cavity to a first depth, where a depth of the second section extends from the first depth to a bottom of the respective rim cavity, where the first section is operable to secure a lens, and where the second section is part of a wire channel that is operable to secure one or more wires; and a nose bridge connecting the two rims, where a back of the nose bridge comprises a bridge cavity that connects between the second section of each rim cavity, and where the bridge cavity is part of the wire channel.

20 Claims, 14 Drawing Sheets

(51) Int. Cl.
*G02C 1/00* (2006.01)
*G02B 27/01* (2006.01)
*G02C 1/06* (2006.01)
*G02C 5/12* (2006.01)
*G02C 5/14* (2006.01)
*B29C 33/48* (2006.01)
*B29C 45/44* (2006.01)

(52) U.S. Cl.
CPC ............... *G02C 1/10* (2013.01); *G02C 5/12* (2013.01); *G02C 5/14* (2013.01); *B29C 33/485* (2013.01); *B29C 45/4457* (2013.01); *G02B 2027/0178* (2013.01)

(58) Field of Classification Search
CPC ........... G02B 2027/0178; B29D 12/02; B29C 45/4457; B29C 33/485
USPC ............................................. 351/41, 83, 86
See application file for complete search history.

(56) References Cited

U.S. PATENT DOCUMENTS

| | | | |
|---|---|---|---|
| 2010/0277563 A1* | 11/2010 | Gupta | H04N 7/142 348/14.08 |
| 2013/0235328 A1* | 9/2013 | Cauvet | G02C 11/10 351/116 |
| 2014/0245789 A1 | 9/2014 | Proud et al. | |
| 2015/0123881 A1 | 5/2015 | Sugihara et al. | |
| 2015/0132873 A1 | 5/2015 | Rogers et al. | |
| 2015/0184998 A1 | 7/2015 | Sherrer | |
| 2015/0190261 A1 | 7/2015 | Shirogauchi et al. | |
| 2015/0245663 A1 | 9/2015 | Memari et al. | |
| 2015/0365508 A1 | 12/2015 | Kwon et al. | |
| 2016/0011663 A1 | 1/2016 | Starner et al. | |
| 2016/0046115 A9 | 2/2016 | Schneider et al. | |
| 2016/0109729 A1* | 4/2016 | Swab | H04W 56/0015 351/116 |
| 2016/0147086 A1 | 5/2016 | Cazalet et al. | |

* cited by examiner

WIRING IN A HEAD-MOUNTABLE DEVICE

CROSS-REFERENCE TO RELATED APPLICATION

This application claims priority to U.S. patent application Ser. No. 15/199,813 filed on Jun. 30, 2016 and entitled "Wiring in a Head-Mountable Device," which is incorporated herein by reference as if fully set forth in this description.

BACKGROUND

Wearable computing devices are becoming increasingly popular. For example, head-mountable display devices, smart watches, body-worn health monitors, and smart headphones or headsets, are becoming increasingly common.

In some cases, a wearable device may be tethered to another computing device. For example, Bluetooth headsets can be tethered to a user's smartphone in order to provide a hands-free mechanism to audio based functions. For example, a Bluetooth headset may allow a user to use voice commands to make and receive phone calls, and/or to dictate text messages, among other possibilities. When a wearable device, such as a Bluetooth headset, is tethered to another computing device, the wearable device may be able to access information stored on the other device, and may be able to control certain functions and/or features of the other device.

SUMMARY

Wearable computing devices can come in a variety of forms and designs. For instance, a wearable computing device may take the form of eyeglasses. Such wearable devices may house electronic components within the frame of the glasses. The electronics may include wires that connect between the different circuits and components housed in the frame. Example embodiments describe a wearable computing device, in the form of glasses, which routes the wiring of the circuits within the structure of the glasses. Other example embodiments describe processes of manufacturing such wearable computing devices.

In one aspect, a head mountable apparatus includes two rims, where an inner top portion of each rim includes a rim cavity, where each rim cavity includes a first section and a second section, where a depth of the first section extends from an edge of the respective rim cavity to a first depth, where a depth of the second section extends from the first depth to a bottom of the respective rim cavity, where the first section is operable to secure a lens, and where the second section is part of a wire channel that is operable to secure one or more wires; and a nose bridge connecting the two rims, where a back of the nose bridge includes a bridge cavity that connects between the second section of each rim cavity, and where the bridge cavity is part of the wire channel.

In another aspect, a method includes attaching a bottom of a first top insert to a first attachable area of a first mold part, where a top surface of the first top insert includes a ridge; attaching a bottom of a second top insert to a second attachable area of the first mold part, where a top surface of the second top insert includes a ridge; sealing a mold by securing the first mold part with a second mold part; injecting a material, using a molding machine, into a mold cavity formed between the two mold parts, where a configuration of the interior of the mold is such that the cavity has an eyeglasses frame shape, and where the top of each top insert extends into the cavity; causing the material to harden to form an eyeglasses frame in the mold; ejecting the eyeglasses frame from the mold, where ejecting the eyeglasses frame from the mold includes: detaching each top insert from the attachable area to which it is attached; removing each top insert from a respective frame cavity in the eyeglasses frame.

In another aspect, an apparatus includes an eyeglasses frame that has a frame cavity extending from a first end of the eyeglasses frame to a second end, where the frame cavity in an inner surface of each top part of the eyeglasses frame that spans across one of a wearer's eyes includes a first section and a second section, where a depth of the first section extends from an inner edge of the respective top part to a first depth, where a depth of the second section extends from the first depth to a bottom of the frame cavity, where the first section is operable to secure a lens, and where the second section of the frame cavity defines part of a channel operable to secure one or more wires.

These as well as other aspects, advantages, and alternatives, will become apparent to those of ordinary skill in the art by reading the following detailed description, with reference where appropriate to the accompanying drawings.

DETAILED DESCRIPTION

Figure 1A:
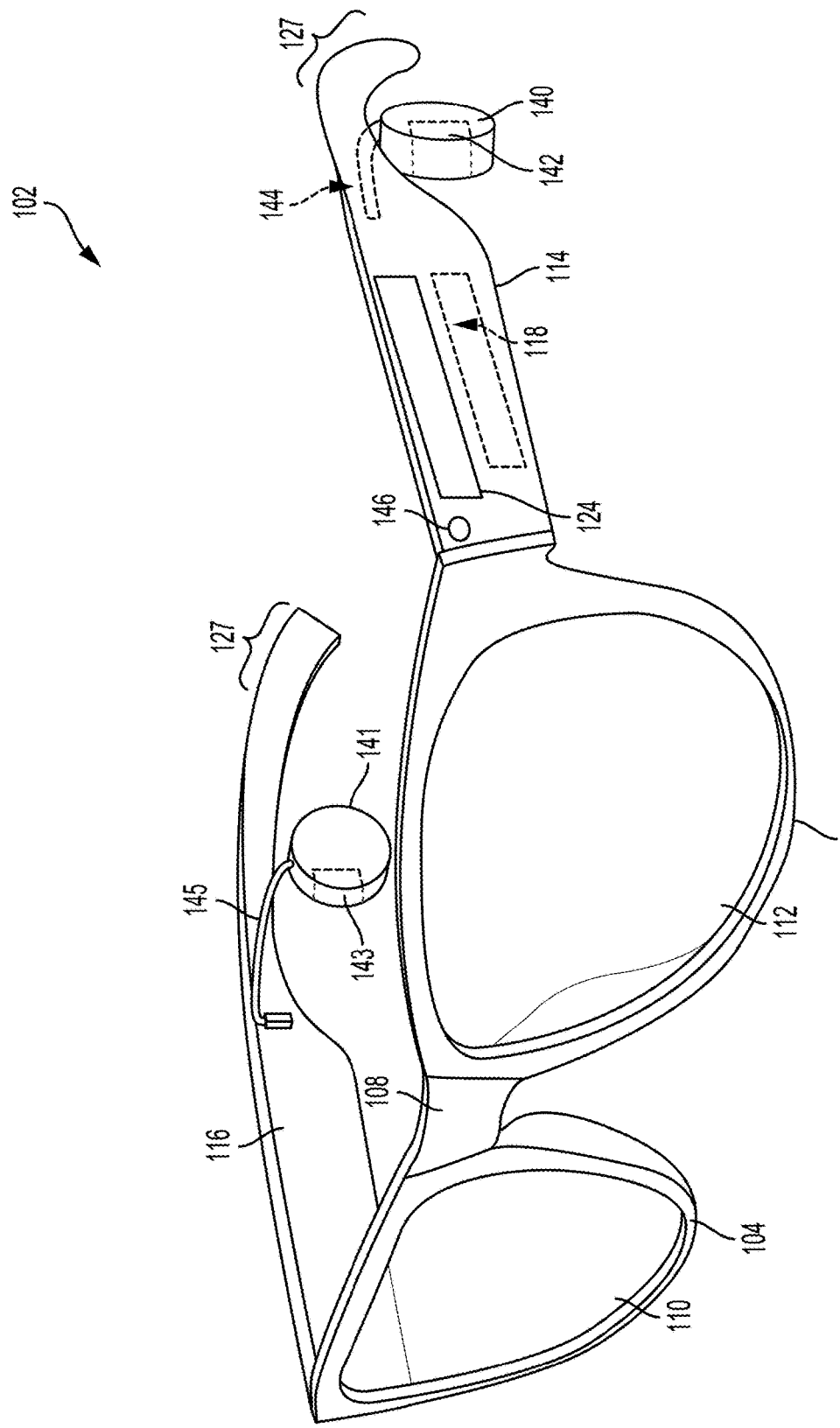
FIG. 1A illustrates a wearable computing device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

This disclosure generally involves a head-mountable device (HMD) that has a structural form similar to that of eyeglasses. The structural components of such an HMD may include (i) a "front frame" that includes two rims that can house lenses, (ii) a nose bridge that connects the two rims, and (iii) two side-arms that connect to the front frame via end-pieces. The HMD may be a single piece, and the structural components above may describe the different sections of the single piece HMD. Alternatively, the structural components may be separate pieces that are assembled together to form the HMD. Furthermore, an HMD may include electronic components, which may be incorporated within the HMD using a variety of designs.

In an embodiment, the HMD may be a wearable computing device that includes electronic components such as printed circuit boards (PCBs), integrated circuits (ICs), wires, batteries, and sensors, among other components. Assembling the electronic components of the HMD in a single area of the HMD may be difficult. Some HMD designs use additional structures (to the structure of the HMD) to house the electronic components. Such designs, however, may be bulky and not aesthetically pleasing.

In some embodiments, some or all of the electronic components may be housed within the side-arms of the HMD. The side-arms may be hollow side-arms, which may also be referred to as "side-pods," that can house electric components. In order to ensure proper functioning of the HMD, the components may need to be connected or coupled with one another. For example, a first side-arm of the HMD may include a rechargeable battery and a battery protection circuit. In such a design, the electronic components housed in a second side-arm may need to be connected to the battery in order to receive power. Additionally and/or alternatively, the electronic components housed in each side-arm may need to be interconnected in order to transfer data, such as audio signals.

In some embodiments, the electronic components in each side-arm may be interconnected using electrical wires. The interconnection scheme may involve a hollow channel in the HMD's structure through which one or more wires, which connect between a first electrical component in a first side-arm and a second electrical component in a second side-arm, may be routed. As such, the channel may provide a connection route for a wire interconnecting the electrical components in the side-arms. The hollow channel may also be referred to as a "wire channel."

More specifically, the wire channel may be made up of cavities in the structural components of the HMD. In the example of the wire channel that may interconnect between the components housed in the side-arms, the wire channel may include a side-arm cavity, in each side-arm, that may lead from a hollow cavity housing the electronic components. Each side-arm cavity may lead to an end-piece cavity in the end-piece to which the side-arm may be connected. Each end-piece cavity may lead to a rim cavity that may be located in the rim to which the end-piece may be connected.

In an embodiment, a rim cavity may be located in an undercut of a rim. The undercut of the rim may be located in the inner surface of a top of the rim or the frame.

Each rim cavity may include two vertically stacked sections. The first section may be located above the second section. The second section may be designed to secure a lens in the rim while the first section may be designed to secure wires or a wire harness. The dimensions of the first section may depend on the dimensions of the wires or the wire harness that may need to be secured in the first section. For example, the top of the first section may be rounded such that cylindrical wires may be secured in the first section. Similarly, the dimensions of the second section may depend on the dimensions of the lens that the second section may secure. For example, the top of the lens may be beveled. Accordingly, the design of the second section may be such that the second section can secure the top of the beveled lens. In some examples, the second section of each rim cavity may be part of a rim groove in the circumference of the inner surface of each rim. The groove can secure a lens in the rim of the frame.

The first section of each rim cavity, at one end, may be connected to a respective end-piece cavity. On the other end, each rim cavity may be connected to a bridge cavity. The bridge cavity may be a horizontal cavity in the nose bridge that may connect between the first section of each rim cavity. Note that the bridge cavity and the first section of each rim cavity are part of the wire channel that interconnects between the side-arms.

Furthermore, an HMD may include one or more wires that may interconnect between the electronic components housed in its side-arms. The wires may be fitted and secured in the wire channel of the HMD. The HMD may also include two lenses. Each lens may be fitted in a rim of the HMD by securing the lens in a respective rim cavity. Each lens, when fitted in the second section of its respective rim cavity, may help secure the one or more wires routed through the first section of its respective rim cavity.

The structure of the HMD, in which components are housed within the HMD, may have a structural flexibility similar to that of the structure of eyeglasses. Further, with the electronics and wires housed almost entirely within the frame, the HMD may be more aesthetically pleasing and less intrusive to a wearer. Additionally, housing the electronics and wires within the frame of the HMD may allow for a sweat and water resistant HMD. Yet further, housing the electronics in the side-arms may allow for a modular HMD where the side-arms may be detached from the end-piece to which they are connected. Such a modular design may allow for different side-arms, which may contain different components, to be attached to the HMD. This design may also allow for ease of repair and/or replacement of faulty electronics in the side-arm.

In some embodiments, an injection molding process may be used to manufacture an HMD or the structural parts of an HMD. In an injection molding process, a mold cavity exists between two sections of a mold that are sealed together. A molten material may be injected into the mold cavity such that the molten material takes the shape of the mold cavity. The molten material is cooled such that it solidifies to form a part in the shape of the cavity. Although this process may be useful to mass manufacture a part that has a consistent shape (i.e., the shape of the cavity), it may be difficult to use this process to manufacture parts with crevices or cavities. This may be due to the molten material encompassing the mold feature that creates the crevice in the part. When the molten material hardens to form the desired part, the molten material encompassing the feature of the mold will harden around the feature. That is, the mold feature may be embedded into the crevice of the part. Therefore, ejecting the part from the mold will likely break or severely damage the part.

A method of manufacturing of an HMD that includes a wire channel is disclosed herein. The method may include using pick-out inserts in an injection molding process to manufacture the HMD. In an embodiment, the mold cavity may have the shape of an HMD frame in order to manufacture the frame. The method may use two pick-out inserts to create at least part of the wire channel in the HMD. A pick-out insert may be made of a material that has a melting temperature higher than the temperature of the injected material. For instance, the inserts may be made from the same material as the material from which the mold is made (e.g., tooling steel or aluminum).

Furthermore, a ridge or mound may be protruding from a top surface of the insert. The ridge may be aligned on the top surface of the insert and may extend across a certain width and length of the top surface. The top surface, and thus the ridge, may be curved into an arch. The top of the insert can be seen as including two sections due to the length of the ridge being shorter than the length of the top surface of the insert. The first section may be the protruding ridge, and the second section may be the top surface of the insert from which the ridge does not protrude.

A bottom of the pick-out insert may be an attachable surface. That is, the bottom of the insert may be shaped such that it may be attached to a surface, such as an attachable area in the mold. For example, the bottom of the insert may be a first part of a joint that may be attachable to a compatible part. In an example, the bottom of the insert may be a part of a finger joint. The area of the mold to which the insert may be attached may also be a part of a finger joint that is compatible with the bottom of the insert. The insert may be attached to the mold by connecting the bottom of the insert to the mold via the coplanar finger joint. In some embodiments, the combined shape of the insert and the area of the mold to which it is attached may be substantially similar to a shape of a lens.

The manufacturing method may include attaching two inserts to a respective area of the mold. Each insert may be attached to an area of the mold such that there are two areas in the mold that substantially have the shape of a lens. Thus, when a molten material is injected into the cavity, some of the material encompasses the inserts and the mold areas to which they are attached. Consequently, a rim shape forms around each insert and the mold area to which it is attached. The two rims may be part of the frame that forms when the mold material hardens. Once the material has hardened, the part may be ejected from the mold.

The inserts may be detached from the mold when the frame is ejected. Subsequently, the inserts may be removed from the frame. A cavity in the shape of the top of the insert may have been formed in the frame when the molten material encompassed the top of the insert during the injection process. As such, the inner top area of the frame encompassing the top of the insert may take the shape of the top of the insert. Thus, when the insert is removed from the frame, a cavity in the shape of the top of the insert is exposed in the frame. As described above, the top of the insert may include two sections. Accordingly, the cavity in the frame may also include two sections. The frame may undergo further processing steps after the inserts are removed from the frame. The processing steps include degating the frame, polishing the frame, and painting the frame.

In an embodiment, the frame and the side-arms of the HMD may be a single piece. In such an embodiment, the side-arms may be manufactured in the same mold as the frame of the HMD. In embodiments where the frame and the side-arms are separate pieces that may be assembled together, the side-arms of the HMD may be manufactured separately in a separate mold. One or more wires, such as wires insulated in a wire harness, may be secured in the channel of the HMD, and may be connected on each end to electronics in the side-pieces. A lens may be secured in each rim of the HMD frame. Each lens, which may be secured in the second section of a respective rim cavity, may secure the wires that may be routed through the first section of each rim cavity.

II. Illustrative Wearable Devices

Systems and devices in which exemplary embodiments may be implemented will now be described in greater detail. However, an exemplary system may also be implemented in or take the form of other devices, without departing from the scope of the invention.

An exemplary embodiment may include a wearable computing device that facilitates voice-based user interactions. However, embodiments related to wearable devices that do not facilitate voice-based user interactions are also possible. In an embodiment, a wearable device may include an ear-piece with a bone-conduction speaker (e.g., a bone conduction transducer or "BCT"). A BCT may be operable to vibrate the wearer's bone structure at a location where the vibrations travel through the wearer's bone structure to the middle ear, such that the brain interprets the vibrations as sounds. The wearable device may be a glasses-style wearable device that includes one or more BCTs and has a form factor that is similar to traditional eyeglasses. The wearable device can be tethered via a wired or wireless interface to a user's phone.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices, without departing from the scope of the invention. As illustrated in FIG. 1A, the wearable computing device 102 comprises frame elements including lens-frames 104, 106 and a center frame support 108 (also referred to herein as a nose bridge), lens elements 110, 112, and extending side-arms (also referred to herein as temples) 114, 116. The center frame support 108 and the extending side-arms 114, 116 are configured to secure the wearable computing device 102 to a user's head via placement on a user's nose and ears, respectively. In some embodiments, the frame elements of the wearable computing device 102 may also include an end-piece on each end of the frame. The end-piece is a contoured piece that may connect between the frame and each of the side-arms.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a user's ears to secure the HMD 102 to the user's head. The extending side-arms 114, 116 may further secure the HMD 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of the head-mounted device 102 or may be positioned remotely from and communicatively coupled to a head-mountable component of a computing device (e.g., the on-board computing system 118 could be housed in a separate component that is not head wearable, and is wired or wirelessly connected to a component that is head wearable). In some embodiments, the on-board computing system 118 may be located within the side-arm 114 as described elsewhere herein. The on-board computing system 118 may include a processor and memory, for example. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 could include an inertial measurement unit (IMU) (not explicitly shown in FIG. 1A), which provides an accelerometer, gyroscope, and/or magnetometer. In some embodiments, an HMD 102 could also include an accelerometer, a gyroscope, and/or a magnetometer that is not integrated in an IMU.

In a further aspect, HMD 102 may include sensors that facilitate a determination as to whether or not the HMD 102 is being worn. For instance, sensors such as an accelerometer, gyroscope, and/or magnetometer could be used to detect motion that is characteristic of the HMD being worn (e.g., motion that is characteristic of user walking about, turning their head, and so on), and/or used to determine that the HMD is in an orientation that is characteristic of the HMD being worn (e.g., upright, in a position that is typical when the HMD is worn over the ear). Accordingly, data from such sensors could be used as input to an on-head detection process. Additionally and/or alternatively, HMD 102 may include optical proximity sensors such as an IR emitter and detector. Data from such sensors could also be used to determine whether or not the HMD 102 is being worn. Additionally or alternatively, HMD 102 may include a capacitive sensor or another type of sensor that is arranged on a surface of the HMD 102 that typically contacts the wearer when the HMD 102 is worn. Accordingly data provided by such a sensor may be used to determine whether or not the HMD is being worn. Other sensors and/or other techniques may also be used to detect when the HMD is being worn.

The HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranged at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In an embodiment, earpiece 140 and 141 may be attached to side-arms 114 and 116, respectively. Earpieces 140 and 141 may each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, an earpiece 140, 141 may be arranged such that a respective BCT 142, 143 can contact the auricle of both of the wearer's ear. Other arrangements of earpieces 140, 141 are also possible. Further, embodiments with a single earpiece 140 or 141 are also possible.

In an exemplary embodiment, a BCT, such as BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In other embodiments, HMD 102 may include other audio output devices. The audio output devices may include one or more devices configured to convert electrical signals into audible signals (e.g., sound pressure waves). As such, the audio output devices may take the form of headphones (e.g., over-the-ear headphones, on-ear headphones, ear buds, wired and wireless headphones, etc.), one or more loudspeakers, or an interface to such an audio output device e.g., a ¼" or ⅛" tip-ring-sleeve (TRS) port, a USB port, etc.). In an example embodiment, the audio output device may include an amplifier, a communication interface (e.g., BLUETOOTH interface), and/or a headphone jack or speaker output terminals. Other systems or devices configured to deliver perceivable audio signals to a user are possible.

In a further aspect, HMD 102 may include at least one audio source (not shown) that is configured to provide an audio signal that drives the audio output devices (e.g., BCT 142 and/or BCT 143). For instance, in an exemplary embodiment, an HMD 102 may include an internal audio playback device such as an on-board computing system 118 that is configured to play digital audio files. Additionally or alternatively, an HMD 102 may include an audio interface to an auxiliary audio playback device (not shown), such as a portable digital audio player, a smartphone, a home stereo, a car stereo, and/or a personal computer, among other possibilities. In some embodiments, an application or software-based interface may allow for the HMD 102 to receive an audio signal that is streamed from another computing device, such as the user's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
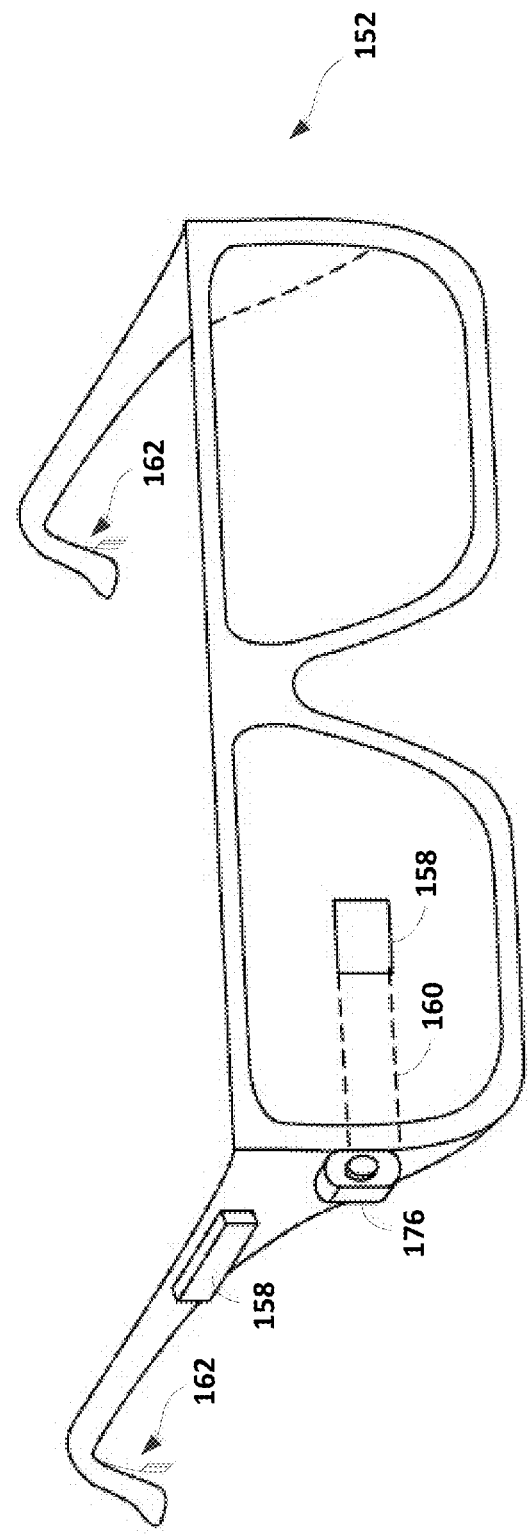
FIG. 1B shows another wearable computing device, according to an example embodiment.

Note that in the example shown in FIG. 1A, HMD 102 does not include a graphical display. FIG. 1B shows another wearable computing device 152 according to an example embodiment, which is similar to the HMD shown in FIG. 1B but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, and a microphone 176 that is configured and functions similarly to microphone 146. HMD 152 may additionally or alternatively include other components, which are not shown in FIG. 1B.

HMD 152 includes a single graphical display 158, which may be coupled to the on-board computing system 158, to a standalone graphical processing system, and/or to other components of HMD 152. The display 158 may be formed on one of the lens elements of the HMD 152, such as a lens element described with respect to FIG. 1A, and may be configured to overlay computer-generated graphics in the wearer's field of view, while also allowing the user to see through the lens element and concurrently view at least some of their real-world environment. (Note that in other embodiments, a virtual reality display that substantially obscures the user's view of the physical world around them is also possible.) The display 158 is shown to be provided in a center of a lens of the HMD 152, however, the display 158 may be provided in other positions, and may also vary in size and shape. The display 158 may be controllable via the computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the HMD for driving such a matrix display. Alternatively or additionally, a laser or LED source and scanning system could be used to draw a raster display directly onto the retina of one or more of the user's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

In some embodiments, some or all of the electronic components (e.g., the on-board computing system 118) of the HMD may be housed in the side-arms 114 and 116. The electronic components may include components such as printed circuit boards (PCBs), integrated circuits (ICs), wires, and a battery (e.g., a lithium-ion battery). In some examples, the electronic components housed in the side-arms may be interconnected, which may allow for transfer of data between the components. For example, wireless communication protocols may be used to transfer data between the electronic components. In other examples, electric wires may be used to carry data and power from electronic components housed in one side-arm to the electronic components housed in the other side-arm. For instance, the electric wires may carry temperature data and audio data. In an example, the audio data may be BCT Data that may be transmitted from an amplifier to the BCT.

For example, in the embodiments where the battery of the HMD is housed in one of the side-arms, power may be transferred from the battery to the electronic components housed in the other side-arm. The electronic components housed in the other side-arm may include a main board, which may include a system on chip (SOC), memory, communication interface module (e.g., WiFi module), antenna, audio amplifiers, and microphone circuitry. Other components housed in the other side-arm may include microphones, BCTs, USB connectors (e.g., USB C connector), buttons/switches, LEDs, sensors (e.g., cameras and proximity sensors), a touchpad, and touchpad controllers. Other components may be stored in the side-arms as well.

In an embodiment, the electric wires, which may connect between the components housed in the side-arms, may be internally routed through the structure of the HMD. That is, the structural components of the HMD may include a wire channel that extends from one side-arm to the other. The wire channel may be a hollow channel that can secure one or more wires or a wire harness. For example, the wire channel can secure a plurality of wires that are TFE insulated. In another example, the wire channel can secure wires enclosed in a TFE (also referred to as thermoplastic elastomer (TPE)) insulated wire harness, which may have a connector at each end. In an embodiment, the wire harness may be TFE insulated except for a middle area that may be insulated using Teflon tape.

Figure 2A:
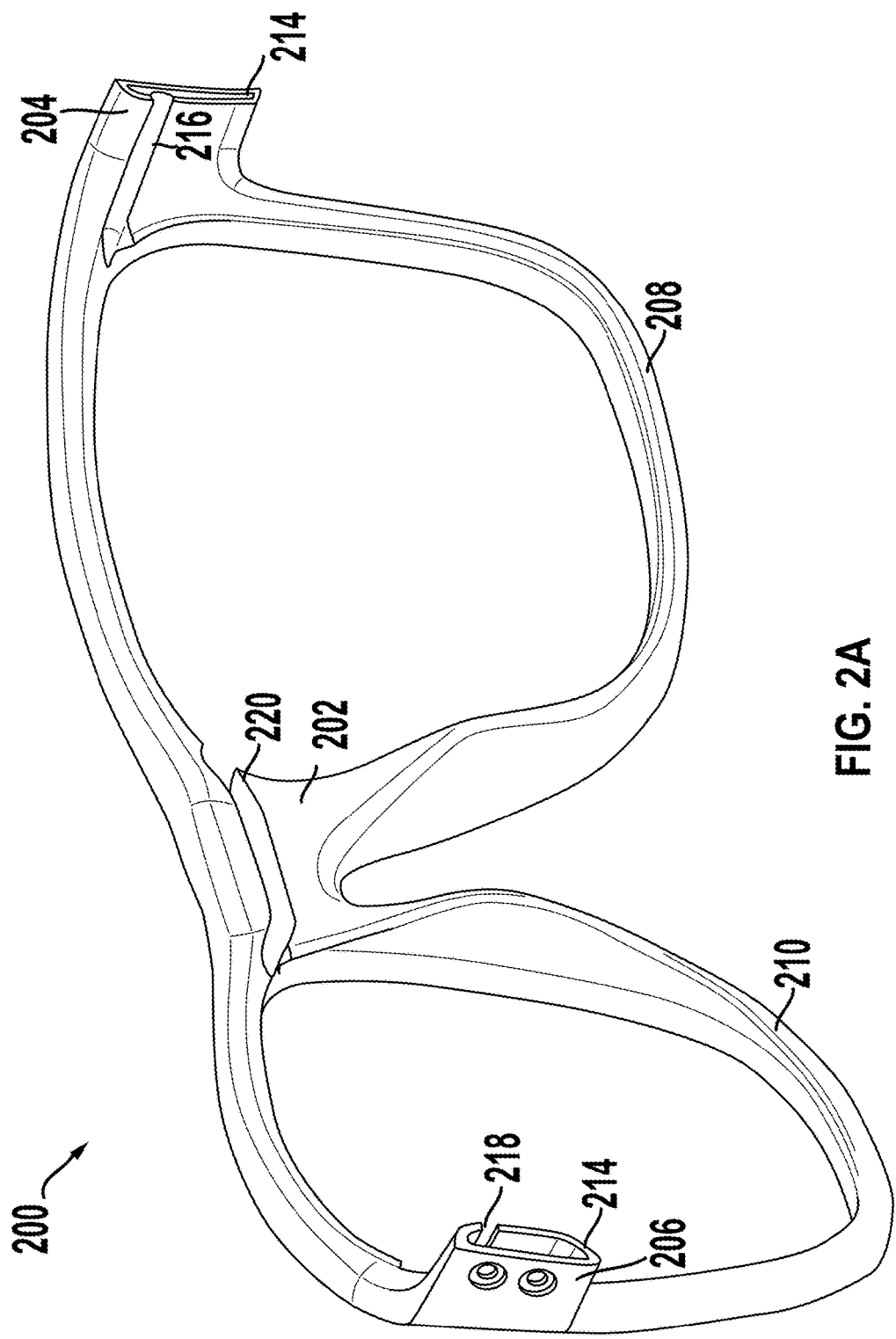
FIGS. 2A and 2B illustrate a frame of a wearable computing device, according to an example embodiment.

FIG. 2A illustrates a frame 200 of a wearable computing device, according to an exemplary embodiment. The wearable computing device that includes the frame 200 may be a head-mountable device that includes some or all of the structural and electronic components of the HMD 102. As illustrated in FIG. 2A, the frame 200 may include a nose bridge 202, end-pieces 204, 206, and rims 208, 210. The nose bridge 202 may connect the two rims 208, 210. Further, each end-piece 208, 210 may be connected to the frame 200 at a first end, and may contour outwardly towards a back direction (i.e., the direction that the back of the frame faces) at a second end. The second end of the end-pieces 208, 210 may be a connectable end. The side-arms (not illustrated in FIG. 2A) may be attached to the frame 200 via the connectable ends 212, 214 of the end-pieces 204, 206.

In some examples, the frame 200 may be a single piece. That is, the components of the frame 200 are manufactured as a single part, and the components 202-210 describe different sections of the single part 200. In such an example, the features of the frame 200 may be described with respect to the sections 202-210 of the frame 200. Equivalently, the different features of the frame 200 may be described with respect to the frame 200. In other examples, the frame 200 may be assembled from a plurality of individual pieces. For instance, the rims 208, 210 and the nose bridge 202 may be a single piece to which end-pieces 208, 210 are attached to form the frame 200. Furthermore, in some embodiments, the rims 208, 210 may be full rims as illustrated in FIG. 2A. In other embodiments, the rims 208, 210 may be partial rims, such as half rims.

In an embodiment, a wire channel of an HMD may be made up of several cavities in the structural components of the HMD. Some cavities may be interior cavities within the structural components of the HMD. Such interior cavities may be below the surface of the component, and thus may not be visible on the surface. Other cavities of the wire channel may be exterior cavities in the outer surface of the component, and thus may be visible on the surface of the component.

Each of the side-arms of the HMD may include an interior cavity, called a side-arm cavity, which may define part of the wire channel. At a first end, each side-arm cavity may be part of or may lead to the cavity in which the electronic components of the HMD are housed. On the other end, each side-arm cavity may lead to an end-piece cavity in the end-piece to which the side-arm is connected. FIG. 2A illustrates an exterior end-piece cavity 216 in the surface of the end-piece 204. Similarly, the surface of the end-piece 208 may also include an exterior end-piece cavity 218, which may be identical to the end-piece cavity 216.

As illustrated in FIG. 2A, the end-piece cavity 216 may be a horizontal exterior cavity spanning the length of the end-piece 204. Each end-piece cavity 216, 218 may be on the inner surface of each end-piece 204, 206, where the inner surface is the surface of the end-piece that faces a user's head when the user is wearing the HMD. As further illustrated in FIG. 2A, one end of the end-piece cavity 216 may extend to the edge of the end-piece 204. The other end of the end-piece cavity 210 may lead to a rim cavity, which is described below. In some examples, each end-piece cavity 216, 218 may have a rounded interior surface such that a cylindrical wire or wire harness may be secured in the wire channel. Further, one or more dimensions of each end-piece cavity 216, 218 may be slightly larger than one or more dimensions of the wires that are to be secured in the wire channel, which may allow for easier installation and removal of the wires.

Figure 3A:
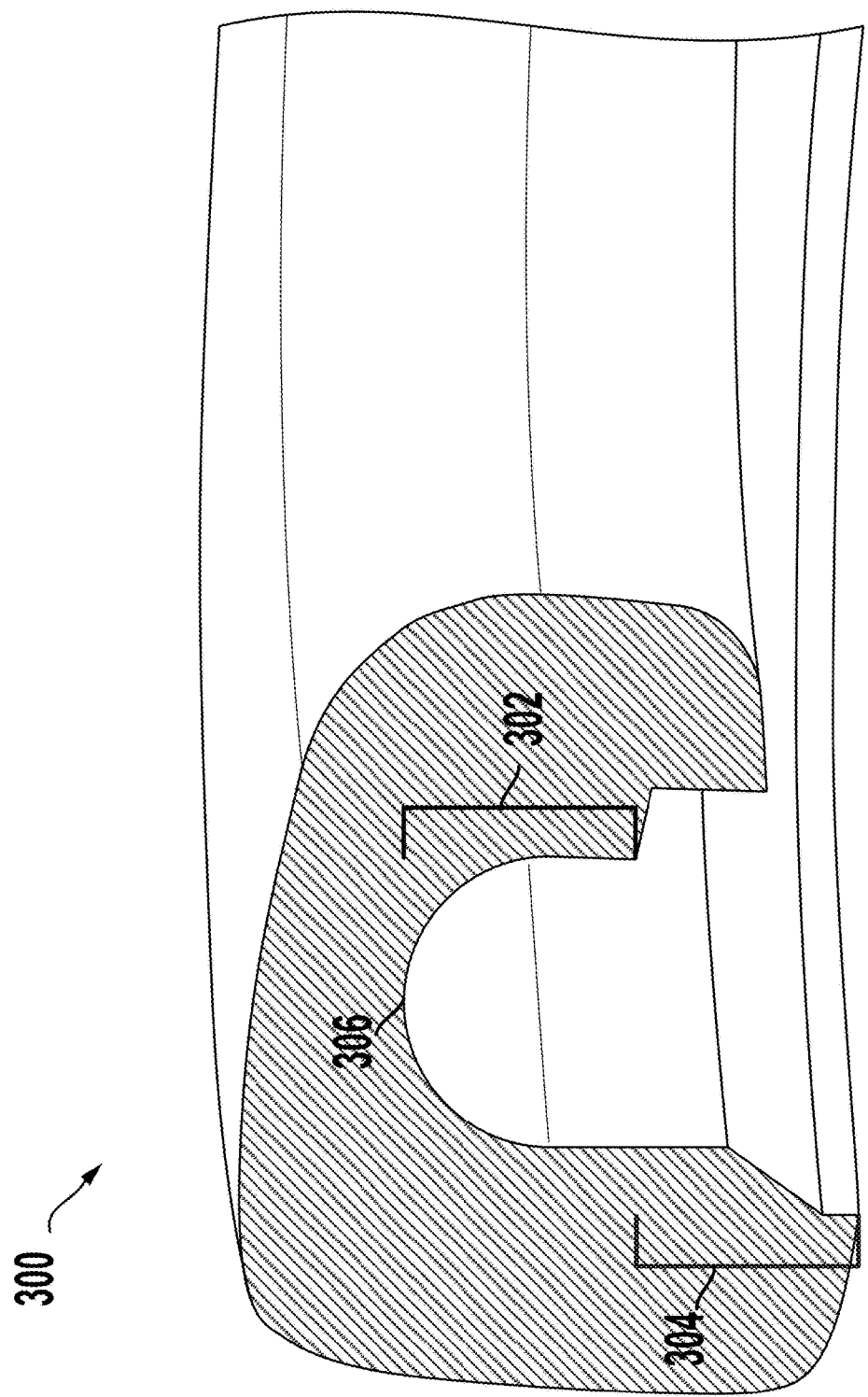
FIGS. 3A and 3B illustrate a cross-section of a cavity, according to an example embodiment.

A rim cavity, which may be connected to an end-piece cavity on one end, may be located in the inner top surface (i.e., undercut) of each of the rims 208, 210. FIG. 3A illustrates a cross-section of a rim cavity 300, according to an exemplary embodiment. As illustrated, the rim cavity 300 may include two sections, a first section 302 and a second section 304. The first section 302 is the section of the rim cavity 300 that may be connected, on one end, to an end-piece cavity, such as the end-piece cavity 216. The first section 302 can secure one or more wires or a wire harness. In an example, the first section 302 may have a rounded top surface such that wires may be fitted in the rim cavity 300. The first section may have other configurations.

The second section 304 of the rim cavity 300 can be used to secure a lens into the rim. A first side of the second section may correspond to the front of the rim (i.e., the side of the rim on the front side of the frame 200). A second side of the second section 304 may correspond to the posterior of the rim (i.e., the side of the rim on the back side of the frame 200). The height of the front end of the rim may be higher than the height of the posterior of the rim. As such, the height of the second section 304 as measured from the edge of the bottom end of the front side of the rim may be higher than the height of the second section 304 as measured from the edge of the back side of the rim. Such a design may allow for a beveled lens to be secured in the rim. Further, a top of the lens secured in the second section 304 may help secure the wires that may be routed through the first section 302. Other configurations of the second section may be possible.

The second section 302 of the rim cavity 300 may also be part of a groove in a rim. As explained above, in some embodiments the HMD may take the form of full rimmed glasses. Full rimmed HMDs may include a fully enclosed rim, such as the rims illustrated in FIGS. 1A and 2A. In such HMDs, a groove, which may include the second section 304 of the rim cavity 300, may extend throughout the inner circumference of the rim. The groove may be used to secure a lens in the rim. In some examples, the HMD may take the form of half rimmed glasses, where the rim of the HMD may include only the top half of a full rim. In such examples, the groove may be found in the inner portion of the top half of the rim (i.e., the second section 304 of the rim cavity 300).

The first section 302 of the rim cavity 300 may lead to a nose bridge cavity 202. As illustrated in FIG. 2A, the nose bridge cavity 220 may be a horizontal cavity that spans the width of the nose bridge 202. The bridge cavity 220 may be an exterior cavity in the surface of the nose bridge 202. Further, the bridge cavity 220 can secure one or more wires or a wire harness. In some examples, the bottom of the cavity may be rounded such that wires may be routed through the bridge cavity 220. The bridge cavity 220 may connect between a first section of the rim cavity of the rim 208 and a first section of the rim cavity of the rim 210. As such, a wire or a wire harness may be routed through the nose bridge 202 from the rim 208 to the rim 210 or vice versa.

The side-arm cavities, the end-piece cavities 214, 216, the first section 302 of the rim cavities, and the bridge cavity 220 may make up the wire channel of an HMD. As such, a wire that may be connected to an electronic component in a first side-arm may be routed through a first side-arm cavity, a first-end piece cavity, a first section of a first rim cavity, a bridge cavity, a first section of a second rim cavity, a second end-piece cavity, a second side-arm cavity, and connected to a second electronic component housed in a second side-arm of the HMD. In an embodiment, the dimensions of the wire channel may be close to the dimensions of the wire harness (bundle) that may be secured in the wire channel. For example, the diameter of the wire bundle may be 1.5 millimeters, and the wire channel may be sized to be around the same dimension. That is, the channel may be smaller or larger than the dimensions of the wire (i.e., smaller or larger on the order of millimeters or micrometers) such that the wire bundle can be secured in the wire channel.

Figure 2B:

FIG. 2B illustrates a wire harness 250 routed through a wire channel of the frame 200. As illustrated in FIG. 2B, the wire harness 250 may be routed through the wire channel of the frame before attaching the side-arms to the frame. Such a design may allow for modularity where different side-arms that may house different electronic components may be easily detached and attached to the frame 200. In another embodiment, the wires may be connected to the side-arms before the side-arms are attached the frame. The wires and the side-arms may then be connected attached to a frame. This may allow for different side-arms to be connected to different style frames.

In some examples, the wire channel may include only some of the cavities described herein. For instance, some HMDs may not include end-pieces (i.e., the side-arms are directly connected to frames). Such HMDs may not include end-piece cavities 214, 216, and thus each side-arm cavity may lead to or may be connected to the rim cavity of the respective rim to which it may be connected.

Figure 3B:
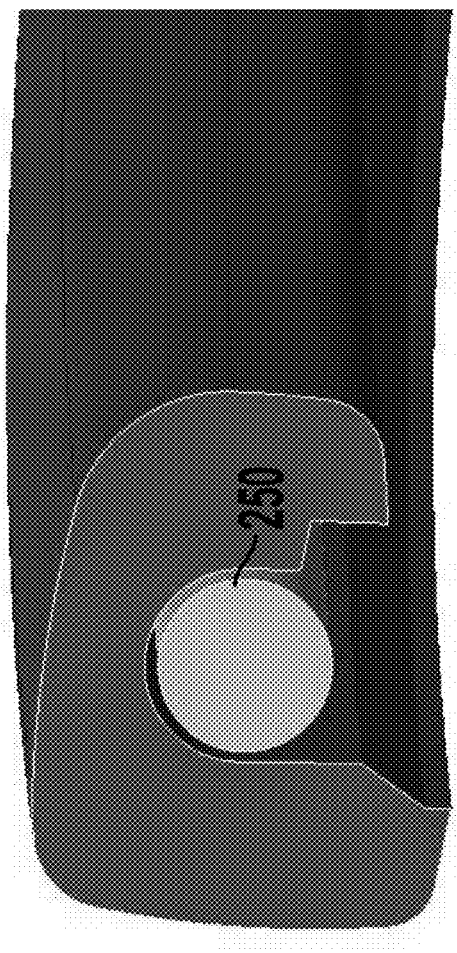
Figure 4:
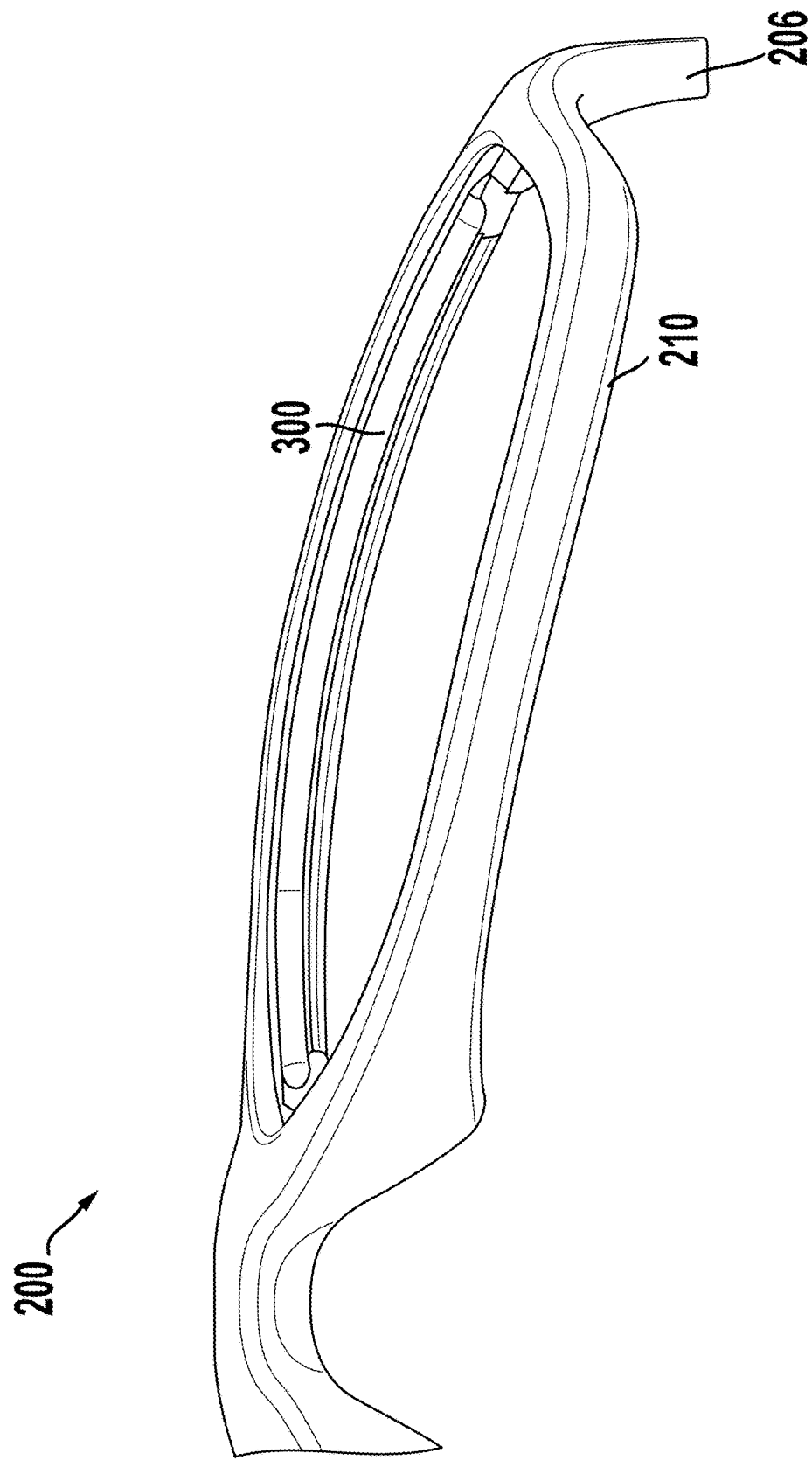
FIG. 4 illustrates a bottom view of a frame of a wearable computing device, according to an example embodiment.

FIG. 3B illustrates the wire harness 250 routed through the cavity 300 of the frame 200, according to an exemplary embodiment. In this example, the top of the first section 302 may be rounded such that the cylindrical wire harness 250 may be fitted in the first section 302. FIG. 4 illustrates a bottom perspective of part of the frame 200, according to an exemplary embodiment. As illustrated in FIG. 4, the cavity 300 may span the inner top portion of the rim 210 or frame 200. The inner top portion of the rim may also be referred to as an undercut of the rim or frame.

In some embodiments, an HMD may include covers that may cover the outer cavities of the HMD. For instance, the HMD may include a respective cover for the end-piece cavities 214, 216 and the bridge cavity 220. A cover may be designed such that it may fit into a respective cavity. The cover may also help secure the wire that may be routed through the cavity into which the cover is designed to be fitted. The cover may be manufactured of the same material that the frame 200 is manufactured from. For instance, the cover may be a plastic cover.

In an embodiment, the cavities described above may be described in reference to the frame 200. For instance, each of the cavities found in the frame 200 may be referred to as a "frame cavity." Yet alternatively, the cavities in the frame 200 may be viewed as a single cavity in the frame. As such, the single cavity may be referred to as a "frame cavity." Other designations are possible.

Within examples, the wearable devices described herein, such as HMD 102, HMD 152, and HMD 200, may be manufactured using a variety of manufacturing processes. In some processes, the structural components of the HMD may be manufactured as a single piece. In other processes, different structural components of an HMD may be manufactured separately, and may later be assembled to form the HMD.

Figure 5:
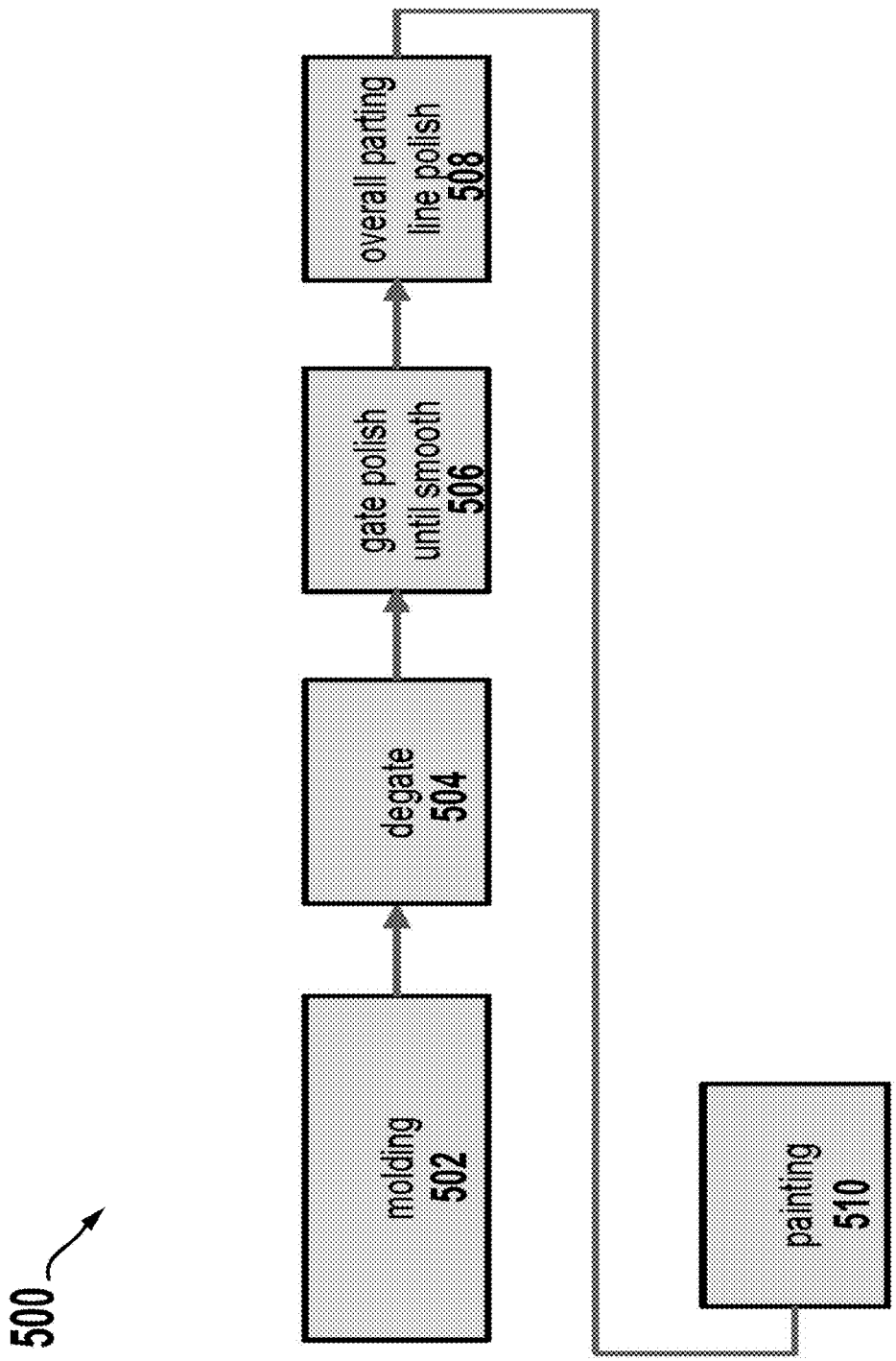
FIG. 5 illustrates a block diagram showing steps of an injection molding process, according to an example embodiment.

In an embodiment, an injection molding process may be used to manufacture the structural components of an HMD, such as HMD 102. FIG. 5 illustrates the steps of an injection molding process 500, according to an example embodiment. The process 500 may be used to manufacture one or more structural components of an HMD. As illustrated in FIG. 5, an injection molding process may include molding 502, degate 504, gate polish 506, overall parting line polish 508, and painting 510. Note that a person of ordinary skill in the art may include other steps to the process 500. Further, in some embodiments, not all of the steps illustrated in FIG. 5 may be included in the process 500.

The injection molding process 500 may be used to manufacture a frame and side-arms of an HMD. The first step, molding 502, may include injecting a molten material into mold cavity of a mold. The mold may be made from tooling steel such as S113 and S8407. Further, the mold may include two halves which may be sealed to form the mold. Such a mold may be referred to as a two-plate mold. The mold cavity may form between the interior topography of the two halves of the mold when the mold is sealed. The inner features of the mold, also called a core of the mold, may be designed such that the mold cavity has a certain configuration or shape. As such, a material that may be injected into the mold may conform to the shape or configuration of the cavity. The injected material may be heated such that material is in a molten state. Subsequently, the injected material may cool in the mold to form a part in that may have a shape of the cavity. In an example, the injected material may be a plastic material. In other examples, the injected material may be a metal, a plastic polymer, a thermoplastic (e.g., TR-90), an elastomer, and glass, among other materials.

In an embodiment, the mold core may be designed such that the mold cavity has the shape of an HMD. For instance, the shape of the mold cavity may be that of the frame and the side-arms of an HMD. In such an embodiment, the manufactured HMD may be a single piece. In another embodiment, the mold may be designed such that the cavity of the mold has the shape of one of the structural components of the HMD. In an example, the mold cavity may have the shape of an HMD frame, such as frame 200. In another example, the mold cavity may have the shape of HMD side-arms. In such an embodiment, the frame of the HMD and the side-arms may be manufactured separately. Subsequently, the frame and side-arms may be assembled to form the HMD.

Figure 6:
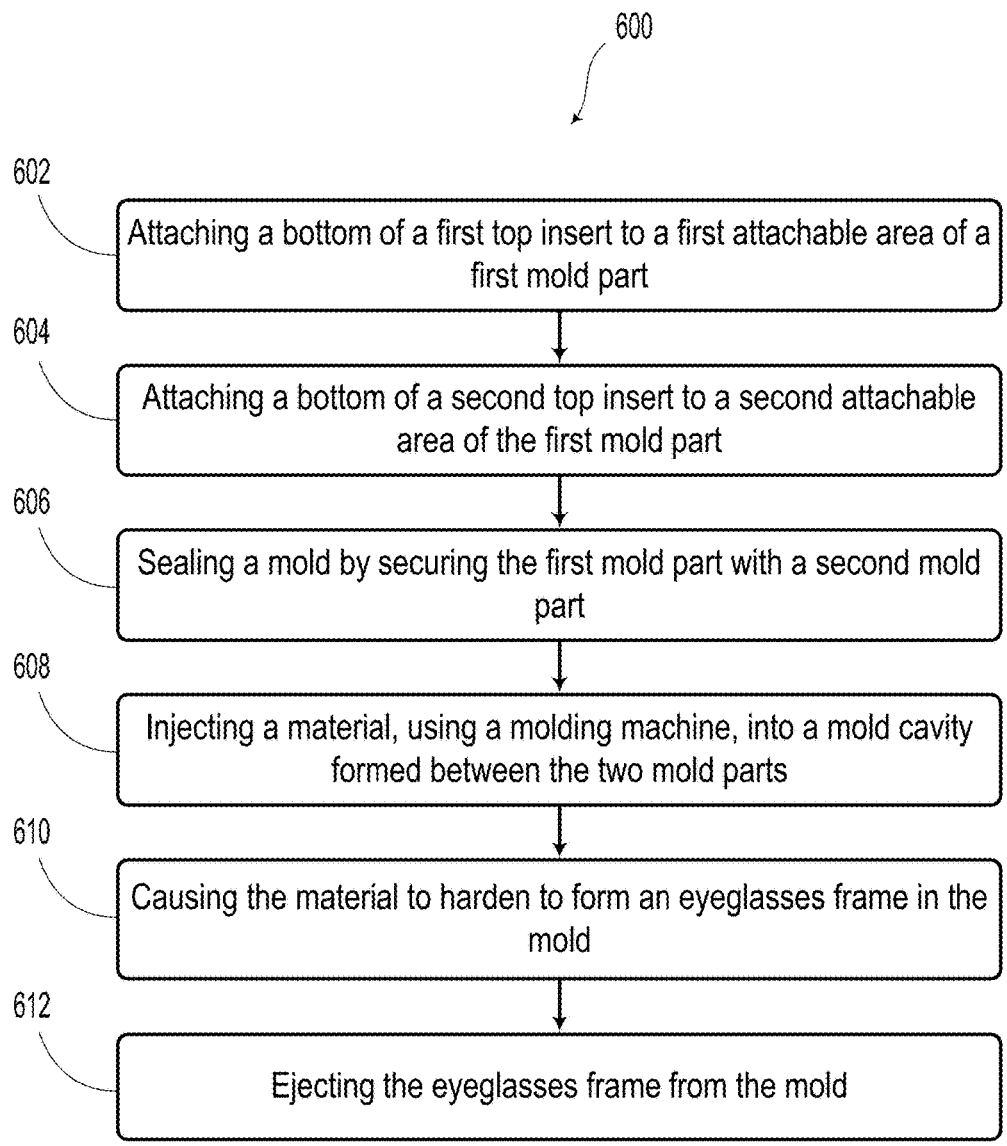
FIG. 6 illustrates a flowchart of a method, according to an example embodiment.

FIG. 6 illustrates a method 600, according to an example embodiment. The method 600 may include various blocks or steps. The method 600 may be carried out as part of the molding 502 step of the injection molding process 500. Note that the blocks or steps of FIG. 6 may be carried out individually or in combination. The blocks or steps may be carried out in any order and/or in series or in parallel. Further, blocks or steps may be omitted or added to the method 600.

Block 602 includes attaching a bottom of a first top insert to a first attachable area of a first mold part. In an example, the mold core may be designed such that the mold cavity may have the shape of an eyeglasses frame. As further explained, a two-part mold may include two parts that are sealed together to form the mold. Each of the mold parts may include attachable areas in their respective cores. For instance, the core of a first mold part may include one or more attachable areas to which pick-out inserts may be attached. In an embodiment, pick-out inserts may be used to form the wire channel cavities in the eyeglasses frame that are manufactured in the mold. Within examples, the dimensions of the pick-out inserts may depend on the desired dimensions of the cavity that the insert will form in the part manufactured in the mold.

Figure 7A:
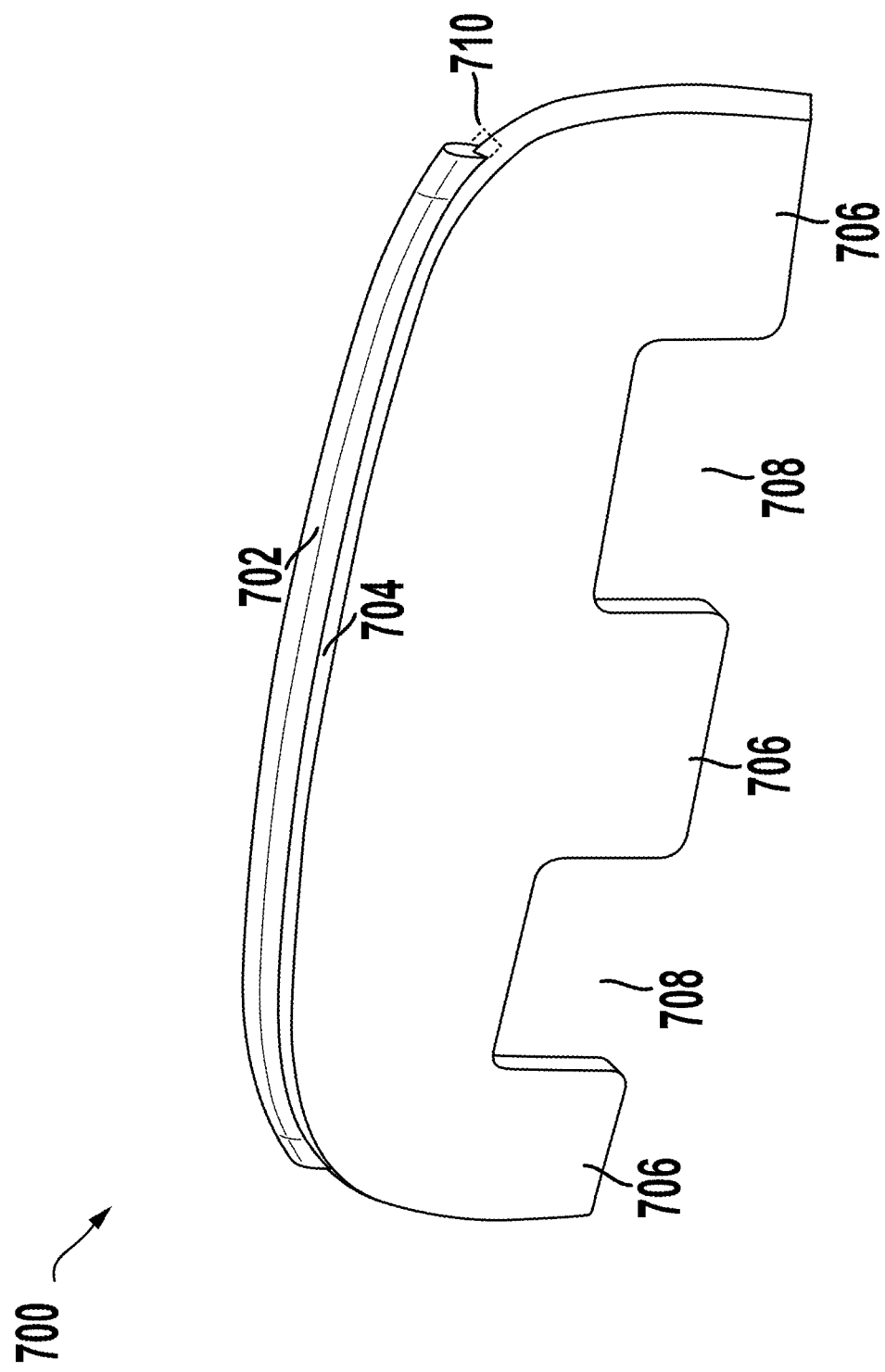
FIG. 7A an illustration of an insert, according to an example embodiment.

FIG. 7A illustrates a pick-out insert 700, according to an example embodiment. In an embodiment, a pick-out insert may be used to form a rim cavity in each undercut of the frame. Such an insert may also be referred to as a "top insert." A top insert may be used to form the two sections (sections 302 and 304 of FIG. 3) of the rim cavity 300 in the frame that is manufactured in the mold. The insert 700 illustrated in FIG. 7A may be a top insert. The top insert 700 may be manufactured from a material that has a melting temperature higher than the temperature of the molten material injected into the mold in subsequent steps. Furthermore, as illustrated in FIG. 7A, a ridge or mound 702 may be protruding from a top surface 704 of the top insert 700. A length 710 of a base of the ridge 702 may be shorter than a length of the top surface 704. As such, in some examples, the ridge 702 may not span along the entire length of the top surface 704. For instance, the ridge may be aligned in the middle of the top surface 704. Further, the ridge 702 may extend across a certain width of the top surface 704. For example, the width of the ridge 702 may be the width of the rim or the part of the frame that spans a wearer's eye.

As illustrated in FIG. 7A, the top surface 704 may be curved into an arch, as the ends of the top surface 704 may curve downwards. As such, the ridge 704 may also be arched. Furthermore, in some embodiments, the top of the top insert 700 can be seen as including two sections due to the length 710 of the ridge 702 being shorter than the length of the top surface 704. For instance, the first section may be the ridge 702 and the second section may be the top surface from which the ridge 702 does not protrude. Alternatively, the ridge 702 may be labeled the second section and the top surface as the first section.

Within examples, the ridge 702 may have different shapes. For example, the ridge 702 may have a semi-cylindrical shape (i.e., the top surface of the ridge 702 may be rounded). As explained above, the dimensions of the ridge may depend on the desired dimensions of the cavity formed by the insert in the part that will be molded in the mold. In this example, the dimensions and shapes of the ridge 702 and the top surface 704 may depend on the desired dimensions and shapes of the rim cavity 300. For instance, the top surface of the rim cavity 300 may be rounded such that the first section 302 can secure wires or a wire harness. In such an example, the ridge 702 may have a semi-cylindrical shape that may form a cavity with a rounded top surface in a frame manufactured in the mold. Other shapes and dimensions are possible.

Further, as illustrated in FIG. 7A, a bottom of the top insert 700 may be an attachable surface. That is, the bottom of the top insert 700 may be shaped such that it may be attached to a different surface, such as an attachable area in the mold. For example, the bottom of the top insert 700 may be a first part of a joint that may be attachable to a compatible part. For instance, the bottom of the top insert 700 may be finger joint. More specifically, the bottom of the top insert 700 may include three wedges 706 separated by two cavities 708. Other configurations of the bottom of the top insert 700 may be possible. For instance, the number of wedges and cavities in a finger joint may be greater than or less than the number of wedges and cavities illustrated in FIG. 7A. In other examples, the bottom of the top insert 702 may be configured as a first part of any one of a bridle joint, a dowel joint, or a dovetail joint. Other types of joints and connections may be possible.

Figure 7B:
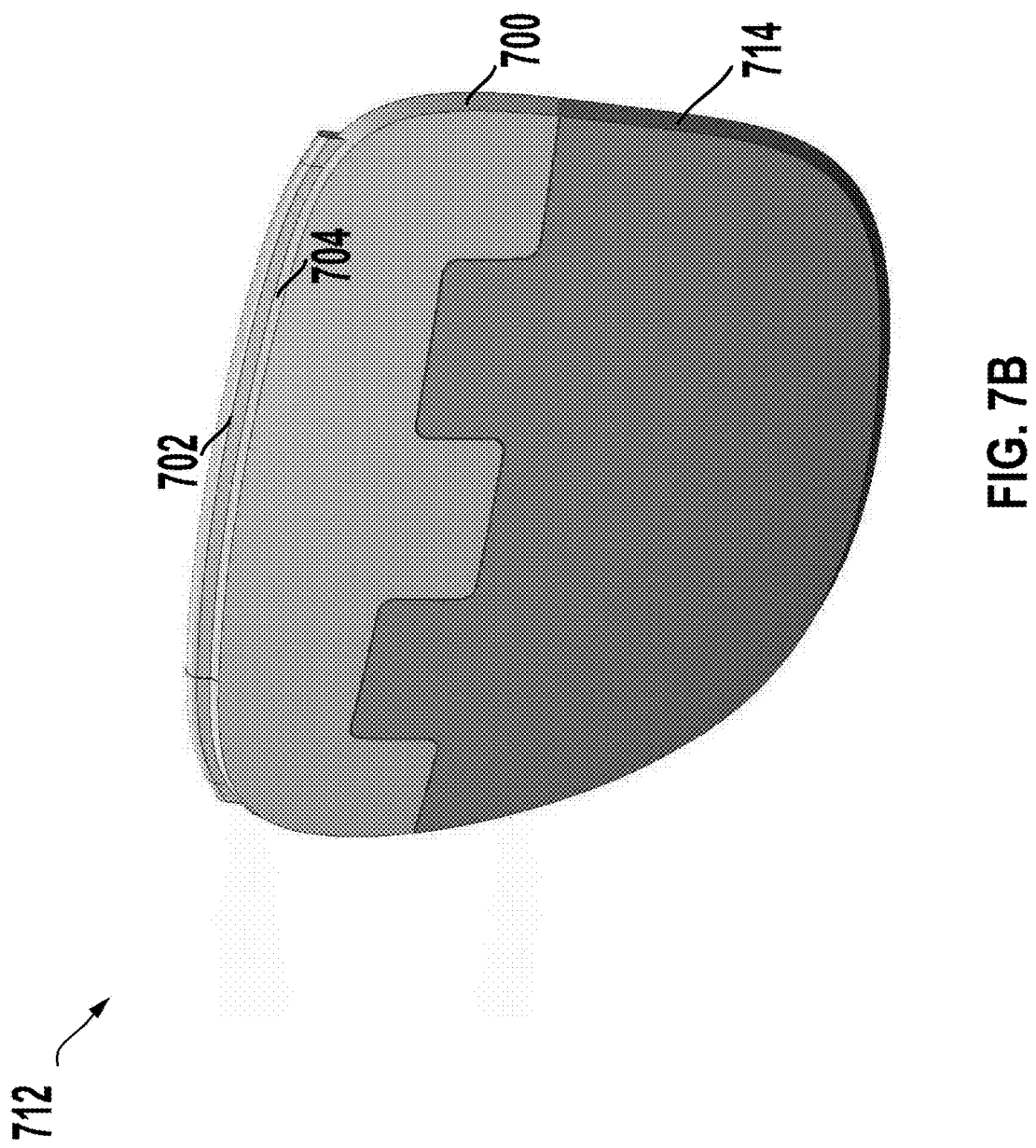
FIG. 7B is an illustration of an insert in a frame, according to an example embodiment.

The area of the mold to which the top insert 700 may be attached may be compatible to be attached to the top insert 700. For example, the area of the mold may be a second part of a finger joint complementary to the bottom of the insert 700. FIG. 7B illustrates the top insert 700 attached to an attachable area of the mold 714, according to an example embodiment. As illustrated, the attachable area of the mold 714 may include two wedges and three cavities. The top insert 700 may be attached to the mold by inserting the three wedges into the cavities of the mold area 714 and the two wedges of the attachable mold area 714 into the cavities of the top insert 700. In some embodiments, the combined shape of the insert and the area of the mold to which it is attached may substantially be a shape of a lens. As illustrated in FIG. 7B, the combined shape of the top insert 700 and the attachable area of the mold 714 may have a similar shape to that of an eyeglasses lens.

Returning to FIG. 6, block 604 includes attaching a bottom of a second top insert to a second attachable area of the first mold part. In an embodiment, the second top insert may be identical to the first top insert. Accordingly, the second top insert may be attached to the second attachable area of the first mold part using a joint, such as a finger joint. The space in the mold between the two inserts may substantially be the desired space between the rims of the frame that is being manufactured in the mold.

Block 606 includes sealing the mold by securing the first mold part with a second mold part. As explained above, a two-plate mold may consist of two parts that, when sealed, form the mold. Thus, once the inserts are attached to the first mold part, the mold may be sealed by securing the two mold parts together.

Block 608 may include injecting a material, using a molding machine, into a mold cavity formed between the two mold parts. Within examples, the secured mold may include a small opening, called a sprue, in the outer surface of the mold that acts as a passage to the mold cavity. The molding machine may include a nozzle through which the molten material may be injected into the sprue of the mold. The molten material may reach the mold cavity by flowing through the sprue and passages in the mold called runners. The molding machine may inject the molten material until the mold cavity is filled. Some of the molten material may surround the circumference of the shapes formed by each of the top inserts and the mold parts to which they are attached.

Block 610 includes causing the material to harden to form an eyeglasses frame in the mold. The molten material in the cavity may solidify by causing it to cool. For example, passing a coolant through holes or pathways in the mold may cause the mold to cool, which may cause the molten material to cool and harden. The mold may also include air vents that may cool the mold and/or the molten material. The molten material which is injected into the cavity may conform to the shape of the mold cavity. As such, the solidified material may be a part in the shape of the cavity. In this example, the solidified part may be an HMD frame.

Figure 7C:
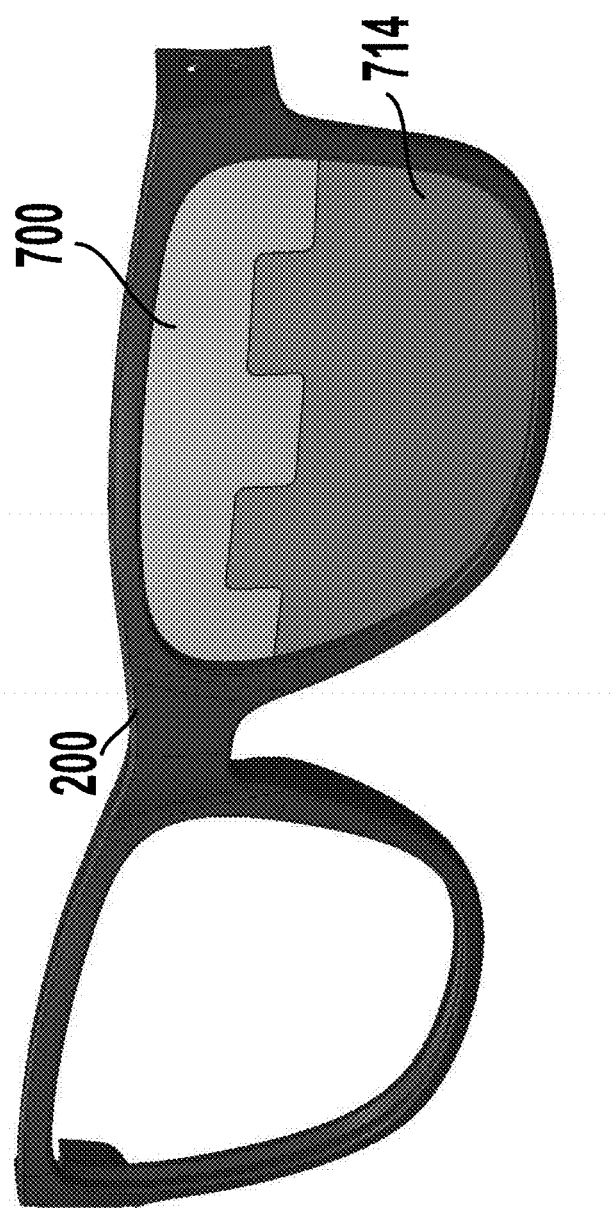
FIG. 7C is an illustration of an insert attached to a surface, according to an example embodiment.

More specifically, the molten material surrounding the shapes formed by each of the top inserts and the mold parts to which they are attached. The solidified part that solidified around each top insert may be the part of the eyeglasses frame that spans one of a wearer's eyes (i.e., the top of a rim). FIG. 7C illustrates a frame 200 that hardened around the top insert 700 and the attachable core part 714. As illustrated in FIG. 7C, the top insert 700 and the attachable core part 714 prevented the molten material from reaching an area of the mold that corresponds to an area where a lens will be fitted in the eyeglasses. As such, the rims of the frame may be formed.

Block 612 includes ejecting the eyeglasses frame from the mold. The mold injection machine may include an ejection system that includes ejection pins. Ejecting the eyeglasses frame from the mold may include opening the mold by separating the two halves of the mold. The frame, which may be resting on one of the mold parts, may be ejected from the mold using the ejection system. The ejection system may activate pins that may rise into the mold part in which the frames are located. The pins may lift the frames from the mold such that the frames may be removed from the mold. Lifting the frames from the mold may detach the bottom of each of the top inserts from the mold. Both top inserts may still be attached to the frame.

Subsequently, the top inserts may be removed from the frame. Removing the top inserts may expose a cavity formed by the top inserts in the frame. More specifically, the shape of the frame cavity may be complementary to the shape of the top of the top insert. That is, the frame cavity may include two sections that are complementary to the ridge 702 and the top surface 704 of the top insert 700. For example, the frame cavity may be similar or identical to the rim cavity 300, where the two sections of the frame cavity correspond to the first section 302 and second section 304 of the rim cavity 300.

Figure 7D:
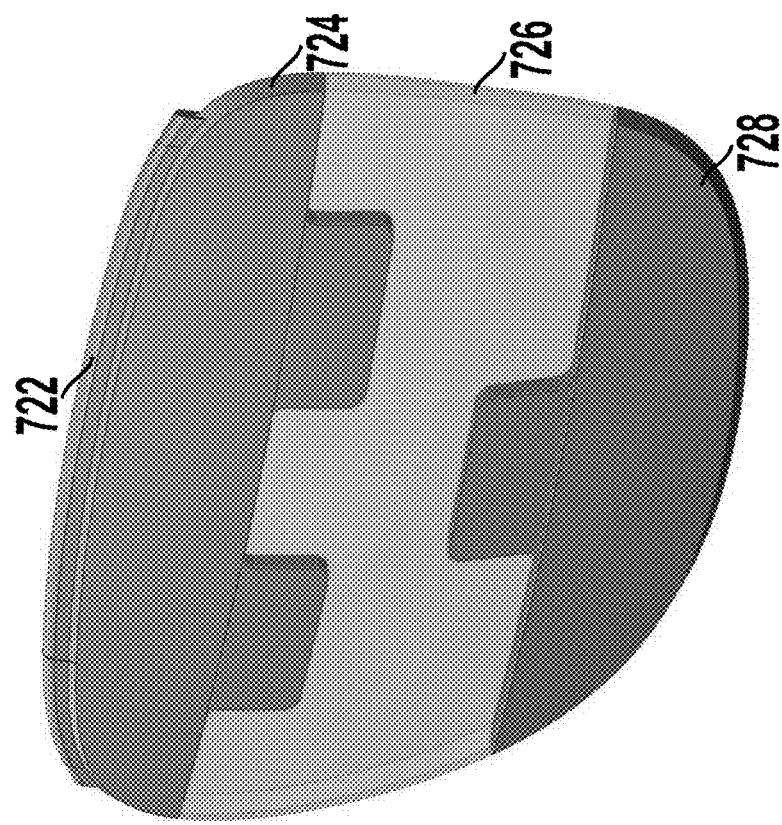
FIG. 7D is an illustration of a two-piece insert, according to an example embodiment.

In some examples, the insert may be a two-piece insert that includes a top insert and a bottom insert. FIG. 7D illustrates a two-piece insert 720, according to an exemplary embodiment. As illustrated in FIG. 7D, the first piece 724 of the insert 720 may be similar or identical to the top insert 700. Similar to the top insert 700, the first piece 724 may be attached to a mold core, via a coplanar joint, to form a cavity in the part that is manufactured in the mold. For example, the top piece 724 may form a cavity in an undercut of a frame that may be manufactured in the mold. Further, the bottom piece 728 may attached to the mold core, via a coplanar joint (i.e., finger joint), to form a groove in the part that may be manufactured in the mold. For example, the bottom piece 728 may form a groove in the inner bottom part of the frame or rim that may be manufactured in the mold. The groove may be used to secure a lens in the frame of the mold. One of ordinary skill in the art would understand how to modify the method 600 described above in order to use the insert 720 in an injection molding process.

In some embodiments, the inserts 700, 720 may be part of a lifter in the molding machine. A lifter is part of the molding machine that can eject into the mold at an angle. For example, in an injection molding process, the inserts 700, 720 may form a cavity in a molded part. Once the part is molded, the lifter, along with the ejector pins, may lift the part such that the part can be removed from the mod. The lifter, however, moves at an angle such that features of the lifter (i.e., inserts 700, 720) are slide out of the manufactured part as the part is lifted to be ejected.

The other cavities of a wire channel described herein may also be formed using pick-out inserts. Additionally and/or alternatively, the cavities may be formed using features of the mold that may be controlled by a slider. The slider may be operable to slide a feature, such as a feature that can form a cavity, into and out of a mold. For example, the end-piece cavities 216, 218 may be formed in a frame using a slider in the mold in which the frame is manufactured. When the molten material is injected into the mold, the material may encompass the feature of the mold that can form the cavity in the mold. For example, the feature may be an elongated feature that can create a horizontal cavity in the surface of the frame (i.e., in the end-piece of a frame). The material may harden around the feature to form the desired cavity. In order to avoid breaking or damaging the frame during ejection, the slider may slide the feature out from the frame. As such, a cavity in the shape of the feature may be formed in the manufactured frame. Features controlled by sliders may be used to from any one of the side-arm cavities, bridge cavity, or end-piece cavities.

III. Illustrative Computing Devices

Figure 8:
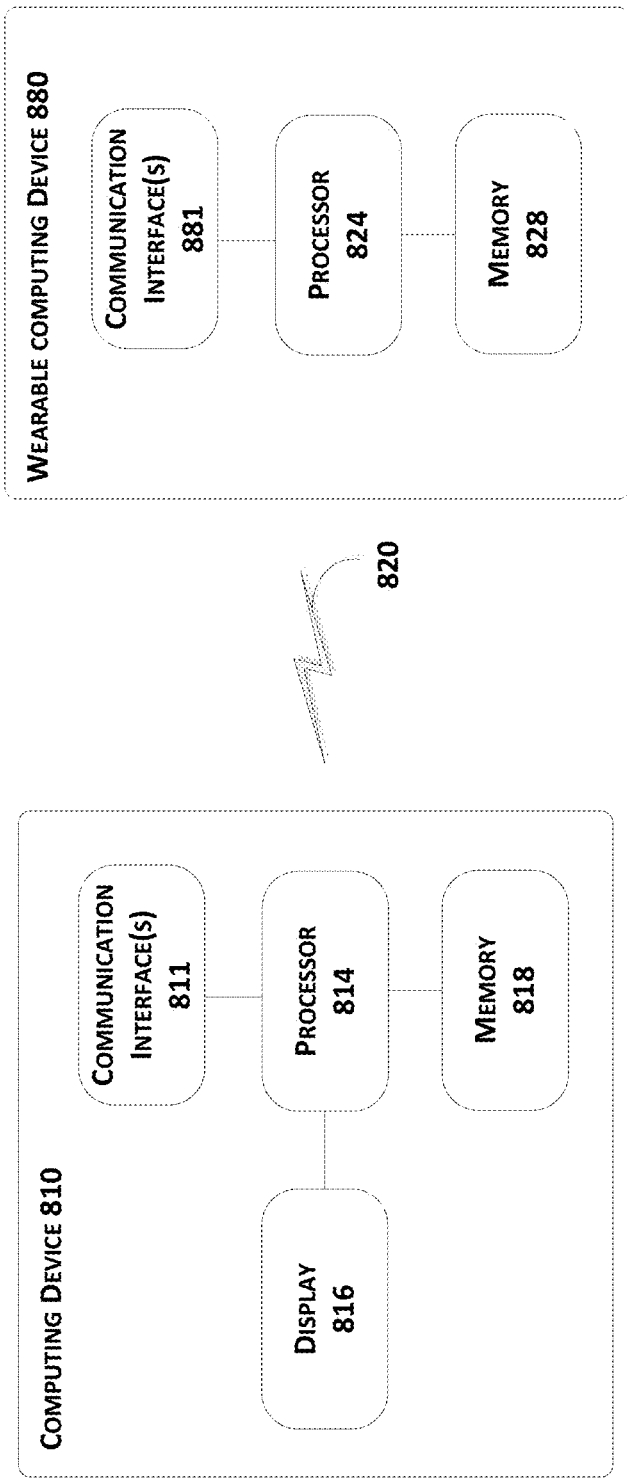
FIG. 8 illustrates a block diagram showing components of a computing device and a wearable computing device, according to an example embodiment

FIG. 8 is a block diagram showing basic components of a computing device 810 and a wearable computing device 830, according to an example embodiment. In an example configuration, computing device 810 and wearable computing device 830 are operable to communicate via a communication link 820 (e.g., a wired or wireless connection). Computing device 810 may be any type of device that can receive data and display information corresponding to or associated with the data. For example, the computing device 810 may be a mobile phone, a tablet computer, a laptop computer, a desktop computer, or an in-car computer, among other possibilities. Wearable computing device 830 may be a wearable computing device such as those described in reference to FIGS. 1A, and 1B, a variation on these wearable computing devices, or another type of wearable computing device altogether.

The wearable computing device 830 and computing device 810 include hardware and/or software to enable communication with one another via the communication link 820, such as processors, transmitters, receivers, antennas, etc. In the illustrated example, computing device 810 includes one or more communication interfaces 811, and wearable computing device 830 includes one or more communication interfaces 831. As such, the wearable computing device 830 may be tethered to the computing device 810 via a wired or wireless connection. Note that such a wired or wireless connection between computing device 810 and wearable computing device 830 may be established directly (e.g., via Bluetooth), or indirectly (e.g., via the Internet or a private data network).

In a further aspect, note that while computing device 810 includes a graphic display system 816, the wearable computing device 830 does not include a graphic display. In such a configuration, wearable computing device 830 may be configured as a wearable audio device, which allows for advanced voice control and interaction with applications running on another computing device 810 to which it is tethered.

As noted, communication link 820 may be a wired link, such as a universal serial bus or a parallel bus, or an Ethernet connection via an Ethernet port. A wired link may also be established using a proprietary wired communication protocol and/or using proprietary types of communication interfaces. The communication link 820 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 820, computing device 810 and wearable computing device 330 may each include one or more communication interface (s) 811 and 831 respectively. The type or types of communication interface(s) included may vary according to the type of communication link 820 that is utilized for communications between the computing device 810 and the wearable computing device 830. As such, communication interface(s) 811 and 831 may include hardware and/or software that facilitates wired communication using various different wired communication protocols, and/or hardware and/or software that facilitates wireless communications using various different wired communication protocols.

Computing device 810 and wearable computing device 330 include respective processing systems 814 and 824. Processors 814 and 824 may be any type of processor, such as a micro-processor or a digital signal processor, for example. Note that computing device 810 and wearable computing device 830 may have different types of processors, or the same type of processor. Further, one or both of computing device 810 and a wearable computing device 830 may include multiple processors.

Computing device 810 and a wearable computing device 830 further include respective on-board data storage, such as memory 818 and memory 828. Processors 814 and 824 are communicatively coupled to memory 818 and memory 828, respectively. Memory 818 and/or memory 828 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, the data storage 104 can be implemented using a single physical device (e.g., one optical, magnetic, organic or other memory or disc storage unit), while in other implementations, the data storage 104 can be implemented using two or more physical devices.

Memory 818 can store machine-readable program instructions that can be accessed and executed by the processor 814. Similarly, memory 828 can store machine-readable program instructions that can be accessed and executed by the processor 824.

VI. Conclusion

It should be understood that any examples described with reference to a "wearable audio device" may apply equally to audio devices that are not configured to be wearable, so long as such audio devices can be communicatively coupled (e.g., tethered) to another computing device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A head mountable apparatus comprising:
   two rims, wherein a top portion of each rim comprises a rim cavity, wherein each rim cavity comprises a first section and a second section, wherein a depth of each first section extends from an edge of the respective rim cavity to a first depth, wherein a depth of each second section extends from the first depth to a bottom of the respective rim cavity, wherein each first section is arranged to secure a lens, wherein each second section is part of a wire channel arranged to secure one or more wires, and wherein a first side of each first section is longer than a second side of each first section;
   a nose bridge connecting the two rims, wherein the nose bridge comprises a bridge cavity that connects between the second sections of the two rims, and wherein the bridge cavity is part of the wire channel; and
   two contoured end-pieces, wherein a first end of each contoured end-piece is coupled to a respective rim, and wherein a second end of each contoured end-piece is a connectable end that is operable to couple to a detachable side-arm.

2. The head mountable apparatus of claim 1, wherein each contoured end-piece comprises an end-piece cavity, wherein each end-piece cavity connects to a respective one of the second sections of the two rims, and wherein each end-piece cavity is part of the wire channel.

3. The head mountable apparatus of claim 2, further comprising:
   two detachable side-arms, wherein each side-arm is connected at a first end to a respective one of the two contoured end-pieces, wherein each side-arm comprises a side-arm cavity that connects to a respective one of the end-piece cavities of the two contoured end-pieces, and wherein each side-arm cavity is part of the wire channel.

4. The head mountable apparatus of claim 3, further comprising:
   two hinges, wherein each hinge secures the first end of each side-arm to the respective one of the contoured end-pieces.

5. The head mountable apparatus of claim 3, further comprising:
   a first electrical component housed in a first side-arm of the two side-arms, wherein the first electrical component comprises a battery;
   a second electrical component housed in a second side-arm of the two side-arms; and
   one or more wires connected to the first electrical component on one end and connected to the second electrical component on an opposite end, and wherein the one or more wires are secured in the wire channel.

6. The head mountable apparatus of claim 5, wherein the one or more wires carry power and data between the first electrical component and the second electrical component, and wherein the data comprises temperature and audio data.

7. The head mountable apparatus of claim 5, wherein the one or more wires are bundled in a wire harness, and wherein a sleeve of the wire harness comprises thermoplastic elastomer (TPE) insulation.

8. The head mountable apparatus of claim 5, further comprising:
   three cover pieces, wherein each cover piece fits into a respective surface exposed by one of the bridge cavity or each end-piece cavity.

9. The head mountable apparatus of claim 5, further comprising:
   two lenses, wherein each lens is fitted into one of the two rims by securing a top portion of the lens into a respective one the rim cavities.

10. The head mountable apparatus of claim 9, wherein each lens is operable to secure the one or more wires in wire channel.

11. The head mountable apparatus of claim 3, wherein a finger-operable touchpad is arranged on a first side-arm of the two side-arms.

12. The head mountable apparatus of claim 1, further comprises a graphical display formed on one of the two lenses.

13. A method comprising:
   attaching two top inserts to a first part of a mold, wherein a top surface of each top insert comprises a ridge, and wherein a bottom surface of each top insert comprises an attachable joint;
   sealing the mold by securing the first mold part with a second mold part;
   injecting a material, using a molding machine, into a mold cavity formed between the first mold part and the second mold part, wherein a configuration of the interior of the mold is such that the cavity has an eyeglasses frame shape, and wherein the top surface of each top insert extends into the cavity; and causing the material to harden to form an eyeglasses frame in the mold.

14. The method of claim 13, wherein attaching the two top inserts to the first part of the mold comprises:
attaching the bottom surface joint of a first top insert to a first attachable area of the first mold part; and
attaching the bottom surface joint of a second top insert to a second attachable area of the first mold part.

15. The method of claim 14, further comprising:
attaching a top of a first bottom insert to a third attachable area of the first mold part;
attaching a top of a second bottom insert to a fourth attachable area of the first mold part.

16. The method of claim 15, further comprising:
ejecting the eyeglasses frame from the mold.

17. The method of claim 16, wherein ejecting the eyeglasses frame from the mold comprises:
detaching the first top insert, the second top insert, the first bottom insert, and the second bottom insert from the respective attachable area to which it is attached;
removing the first top insert, the second top insert, the first bottom insert, and the second bottom insert from a respective groove in the eyeglasses frame.

18. The method of claim 15, wherein each of: the top of the first bottom insert, the top of the second bottom insert, and bottom surface of the top insert comprises a respective finger joint.

19. The method of claim 13, wherein the attachable joint comprises a finger joint, and wherein the finger joint comprises three wedges separated by two cavities.

20. The method of claim 13, wherein a length of the top surface of each top insert is greater than a length of the ridge, and wherein a height of the ridge extends from the top surface to a top of each top insert.

* * * * *